United States Patent
Klügel et al.

(10) Patent No.: US 11,811,672 B2
(45) Date of Patent: Nov. 7, 2023

(54) DATA VALIDITY BASED NETWORK BUFFER MANAGEMENT SYSTEM

(71) Applicant: Airbus (S.A.S.), Blagnac (FR)

(72) Inventors: Markus Klügel, Munich (DE); Paulo Mendes, Munich (DE)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 17/825,060

(22) Filed: May 26, 2022

(65) Prior Publication Data
US 2022/0393990 A1 Dec. 8, 2022

(30) Foreign Application Priority Data

Jun. 7, 2021 (EP) ..................................... 21178069

(51) Int. Cl.
*H04L 47/56* (2022.01)
*H04L 49/00* (2022.01)

(52) U.S. Cl.
CPC .......... *H04L 47/56* (2013.01); *H04L 49/3018* (2013.01)

(58) Field of Classification Search
CPC ..... H04L 47/56; H04L 49/3018; H04L 47/32; H04L 49/90; H04L 47/564; H04L 67/12; H04L 67/61
See application file for complete search history.

(56) References Cited

U.S. PATENT DOCUMENTS

| | | | |
|---|---|---|---|
| 6,407,999 B1 * | 6/2002 | Olkkonen | H04Q 11/0478 370/395.42 |
| 6,704,316 B1 * | 3/2004 | He | H04L 47/2433 709/218 |
| 7,046,665 B1 * | 5/2006 | Walrand | H04L 47/2441 370/395.5 |
| 2006/0133377 A1 * | 6/2006 | Jain | H04L 63/1441 370/392 |
| 2007/0292108 A1 * | 12/2007 | Reichert | H04N 5/783 386/346 |
| 2010/0329279 A1 * | 12/2010 | Li | H04W 8/04 370/465 |
| 2020/0145876 A1 * | 5/2020 | Dao | H04W 28/06 |
| 2021/0297362 A1 * | 9/2021 | Eckert | H04L 47/32 |
| 2022/0070104 A1 * | 3/2022 | Luo | H04L 47/283 |
| 2022/0078857 A1 * | 3/2022 | Kim | H04W 76/10 |

FOREIGN PATENT DOCUMENTS

EP 1 335 556 A1 8/2003

OTHER PUBLICATIONS

European Search Report for U.S. Appl. No. 21/178,069 dated Oct. 4, 2021.

* cited by examiner

*Primary Examiner* — Ayaz R Sheikh
*Assistant Examiner* — Tarell A Hampton
(74) *Attorney, Agent, or Firm* — KDW FIRM PLLC

(57) ABSTRACT

Systems and methods for data scheduling and queuing. A data network node is configured to transmit data in a store-and-forward fashion. The data network node includes a delay and validity determination module that determines and assigns a validity value to each data packet incoming via an input port based on a time stamp of the data packet, a current time value, an expected delay on a route of the data packet to its destination, and a packet urgency value. A scheduling module and a queue managing module execute their functions based on the validity value assigned to a data packet in a transmission buffer.

20 Claims, 4 Drawing Sheets

DATA VALIDITY BASED NETWORK BUFFER MANAGEMENT SYSTEM

CROSS-REFERENCE TO RELATED APPLICATION

This application claims priority to EP 21178069.7 filed Jun. 7, 2021, the entire disclosure of which is incorporated by reference herein.

TECHNICAL FIELD

The description relates to data network technology. In particular, the description relates to a data network node, a data network, a method for forwarding data packets in a data network, and an aircraft that includes such a data network.

BACKGROUND

Data networks typically include several data network nodes that are interconnected with each other by wired or wireless connections using any data transmission technologies (optical signals, electrical signals, etc.). Data produces and data consumers (generally: end devices) are connected to at least one data network node so that data can be transmitted between two end devices via a route through the data network. Data networks typically provide different paths between the two end devices that define a data transmission connection.

Data networks may be configured to meet certain data transmission criteria that are individually set for a certain environment. For example, data transmission criteria may be defined to meet real time requirements or requirements of a certain application being executed on at least one of the end devices.

SUMMARY

It may be seen as an object to increase data transmission efficiency in a data network. This object is solved by the subject matter herein.

A data network node and a method for forwarding data packets in a data network are disclosed herein. Further embodiments can be derived from the following description.

Many of the features described with reference to the data network node may be implemented as method steps, or vice versa. Therefore, the description provided in the context of the data network node applies in an analogous manner also to the method for forwarding data packets in a data network.

A data network node is configured for forwarding data packets in a data network. The data network node comprises an input port, an output port, a transmission buffer, and a processing unit. The transmission buffer is assigned to the output port. The transmission buffer includes at least one data packet queue that is configured to hold data packets of at least one data traffic class. The processing unit is connected to the input port and to the transmission buffer. The processing unit is configured to forward data packets received at the input port to the transmission buffer. The processing unit comprises a delay and validity determination module, a scheduling module, and a queue managing module. The scheduling module is configured to execute a first function serving the at least one data packet queue in the transmission buffer to achieve a set of performance criteria. The queue managing module is configured to execute a second function avoiding an overflow of the transmission buffer by applying a queue management strategy to the at least one data packet queue. The delay and validity determination module is configured to determine and assign a validity value to each data packet incoming via the input port based on a time stamp of the data packet, a current time value, an expected delay on a route of the data packet to its destination, and a packet urgency value. The scheduling module and the queue managing module are configured to execute the first function and the second function, respectively, based on the validity value assigned to a data packet in the transmission buffer.

The functions of the scheduling module and of the queue managing module are executed and performed based on the validity that is assigned to a data packet by the delay and validity determination module.

Particularly, the packet urgency value defines by when a data packet must be received at the destination (data consumer) in order to reasonably enable processing of the data packet by the destination.

The validity value indicates the relevance of a data packet for an application relying on the data packet. For example, the validity value is determined based on the passed time, the expected transmission time to the destination, and the urgency of the data packet. When it is determined that a data packet cannot arrive the destination within a certain time limit, this data packet can be dropped, because it has no value for the destination as it arrives too late. By determining such a validity value, invalid data packets can be dropped by a data network node, avoiding that a useless data packet is transmitted to its destination and dropped then due to it arriving too late. Therefore, potentially useless data packets are dropped by a data network node when it is to be expected that this data packet reaches the destination late and has no value for the destination node. The data network node eliminates or drops "invalid" data packets based on the validity value. Invalid data packet no longer require data transmission bandwidth in the data network, therefore increasing the data transmission efficiency.

The validity value is particularly used by the scheduling module and the queue managing module when these modules process the data packets in the transmission queue.

Particularly, the data network node does not implement a static service level agreement to define the priority of all data packets resulting in the same priority for all data packets of the same type or data flow which does not change over time. Rather, the data network node, particularly the delay and validity determination module, is configured to handle different data packets of the same connection or data flow individually and to assign a validity value to each data packet individually without consideration of the validity value of previous data packets of the same flow or connection (e.g., data traffic between a first end device and a second end device or between a first application and a second application). Thus, the overall priority level assigned to a data flow may change over time.

In one embodiment, different packets that are assigned to the same data packet queue have different priorities, i.e., different validity values. In this embodiment, the data network node, particularly the queue managing module, may be configured to adapt the order of the data packets in the queue based on the validity value of the data packets in that queue.

The validity value is especially determined and assigned to a data packet without consideration of the payload carried in a data packet. Rather, the validity value is determined based on the parameters indicated above. The validity value is determined based on a consideration of the packet characteristics (at least time stamp, current time value, expected delay on a route of the data packet to its destination, and a packet urgency value) to thereby identify the time period within which the packet can be reasonably or usefully processed by the destination.

The validity value indicates if a packet can be transmitted to its destination in time and within which time this transmission can be done. If it can be expected that a data packet cannot be delivered to its destination in time, this data packet is invalid and can be dropped. Based on the expected delay and the urgency value, the data network node can determine within which time the data packet must be delivered to its destination.

According to an embodiment, the delay and validity determination module is configured to check if an incoming data packet has a time stamp, and to add the current time value as the time stamp to a header of the incoming data packet when the incoming data packet has no time stamp.

The time stamp is used in subsequent processing steps to determine the elapsed time since a data packet has entered the data network node and/or the data network.

According to a further embodiment, the data network node is configured to receive the expected delay of a data packet on the route to its destination via a control interface or to read the expected delay of a data packet on the route to its destination from a configuration file.

The expected delay may be either provided by another entity in the data network that monitors the throughput on certain routes and can, therefore, inform the data network node about the time required to transmit a data packet from this data network node to some or all destinations (end devices, networks, or sub-networks) connected to the data network. Alternatively, the expected delay may be read from a configuration file that includes a transmission time required from the data network node to destinations (end devices, networks, or sub-networks) connected to the data network.

According to a further embodiment, the at least one data packet queue is configured to hold data packets of multiple data traffic classes, wherein the delay and validity determination module is configured to determine a data traffic class validity value associated with each one of the multiple data traffic classes.

In this embodiment, the delay and validity determination module determines a validity value associated with each traffic class, i.e., over all data packets of a certain data packet traffic class included in the data packet queue.

According to a further embodiment, the delay and validity determination module is configured to determine and update the validity value of a data packet in the transmission buffer upon a request and/or when a predetermined period of time has expired.

The validity value may be determined or updated by the delay and validity determination module when one of the other modules (scheduling module, queue managing module) requests such an update or when a certain period of time has expired. For example, the validity value may be determined repeatedly after same or different periods of time have expired.

According to a further embodiment, the data network node is configured to drop a data packet when its validity value exceeds or falls below a predetermined threshold value.

The validity value may be an abstract numeric value. A high usefulness of a data packet for its destination application may be indicated either by a high numeric value or a low numeric value. However, a data packet typically is only useful and can be processed by its destination application within a certain period of time. When the transmission period lasts longer than the time range within which the destination can process a data packet, the data packet has lost its usefulness for the destination. In such a case, the validity value of the data packet either exceeds or falls below a threshold value, and the data packet is dropped by the data network node.

According to a further embodiment, the data network node is configured to trigger the delay and validity determination module every time a data packet arrives at the input port.

According to a further embodiment, the queue managing module is configured to re-arrange a position of data packets in the transmission buffer based on the validity value of the data packets.

According to a further embodiment, the queue managing module is configured to replace and/or discard data packets in the transmission buffer based on the validity value of the data packets.

According to a further embodiment, the queue managing module is configured to determine the urgency value of a data packet in the transmission buffer based on the current time value and the expected delay on the route of the data packet to its destination, wherein the queue managing module is configured to determine a position of the data packet in the at least one data packet queue based on the urgency value.

According to a further embodiment, the scheduling module is configured to determine, based on the validity values of the data packets in the transmission buffer, which data packet of which one of the at least one data traffic class to process next.

According to a further aspect, a method for forwarding data packets in a data network is provided. The method comprises: receiving data packets at an input port of a data network node; determining and assigning a validity value to each data packet incoming via the input port based on a time stamp of the data packet, a current time value, an expected delay on a route of the data packet to its destination, and a packet urgency value; executing, by a scheduling module, a first function serving a data packet queue in a transmission buffer to achieve a set of performance criteria; executing, by a queue managing module a second function avoiding an overflow of the transmission buffer by applying a queue management strategy to the data packet queue; wherein the first function and the second function are executed based on the validity value determined and assigned to the data packet.

The method substantially relates to the functions of the data network node. Therefore, for the sake of brevity, the method steps are not described in all their details here. Reference is made to the functions of the data network node and its components.

According to a further aspect, a data network is provided. The data network comprises a plurality of end devices and a plurality of data network nodes as described above and hereinafter. The plurality of data network nodes are communicatively interconnected with one another to transmit data packets from a first end device of the plurality of end devices to a second end device of the plurality of end devices.

In one embodiment, the data network may comprise at least one or multiple data network nodes as described herein and at least one or multiple data network nodes (routers, switches) that do not implement the validity based queuing as described herein.

According to a further aspect, an aircraft is provided that comprises a data network as described above and hereinafter.

In a preferred use case, the data network may be implemented in an aircraft to interconnect aircraft devices and passenger devices. For example, the data network may communicatively interconnect sensors (data producers) and actuators or control devices (data consumers). Furthermore, the data network may allow passenger devices to establish a data connection and access (local or global) services provided by the aircraft to the passengers. The end devices may be connected wireless or by wired connections to one or more data network nodes. Examples for sensors are smoke detection sensors, temperature sensors, or fuel gauging sensors. Examples for actuators are control surfaces, heaters, lights, or any other devices in a passenger service unit. Control devices may also be connected to the data network and configured to receive a command by an operator (passenger or crew) and transmit the command to an end device to execute a function.

According to an embodiment, the first end device is a sensor located in the aircraft and arranged to sense a physical parameter of a component of the aircraft, and the second end device is an actuator located in the aircraft and arranged to initiate a function of a component of the aircraft.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
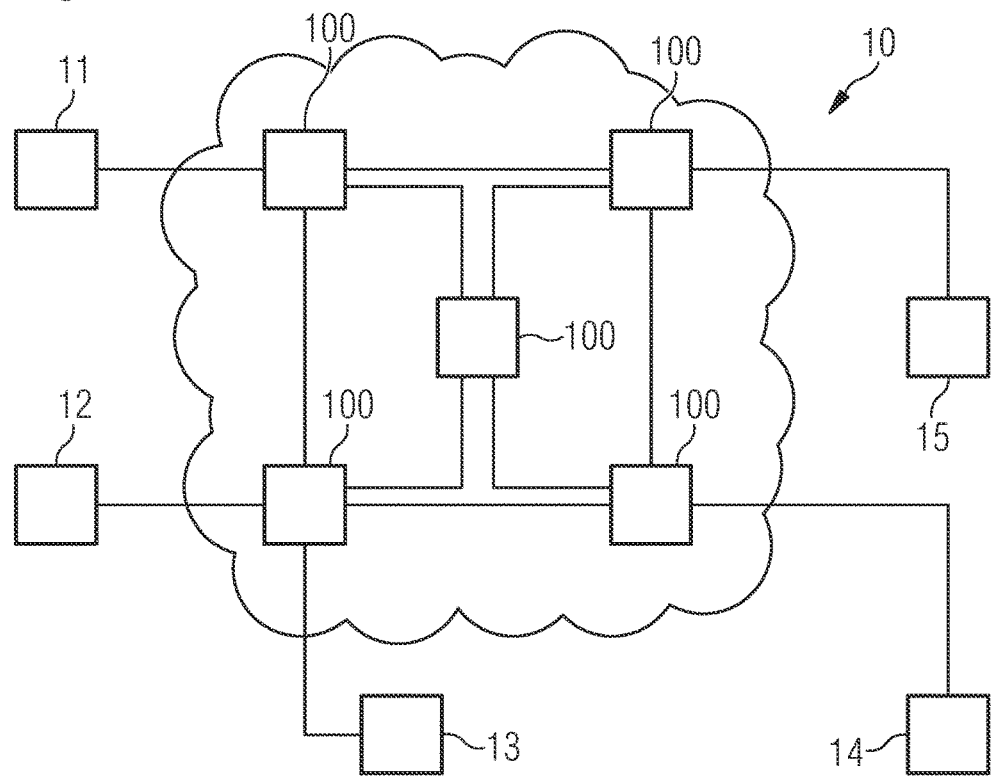
FIG. 1 is a schematic representation of a data network.

The following detailed description is merely as an example in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a data network 10 that comprises multiple data network nodes 100. The data network nodes 100 are interconnected with one another to provide multiple different data transmission paths for data packets that are transmitted from a data producer to a data consumer, e.g., from one of the end devices 11, 12, 13, 14, 15 to another one of these end devices.

The end devices 11, 12, 13, 14, 15 are connected to at least one data network node 100 to get access to the data network 10 and to use the data transmission services provided by the data network 10. The end devices 11, 12, 13, 14, 15 are configured to use a wired connection (using electrical or optical signals for data transmission) or a wireless connection. The same applies to the connections between the data network nodes 100.

The data network 10 is configured to transmit data as described above and hereinafter. Particular aspects of the data network 10 relate to scheduling and queuing systems. The data network 10 particularly is an avionic network and is configured to relay data packets in a store-and-forward fashion.

Figure 2:
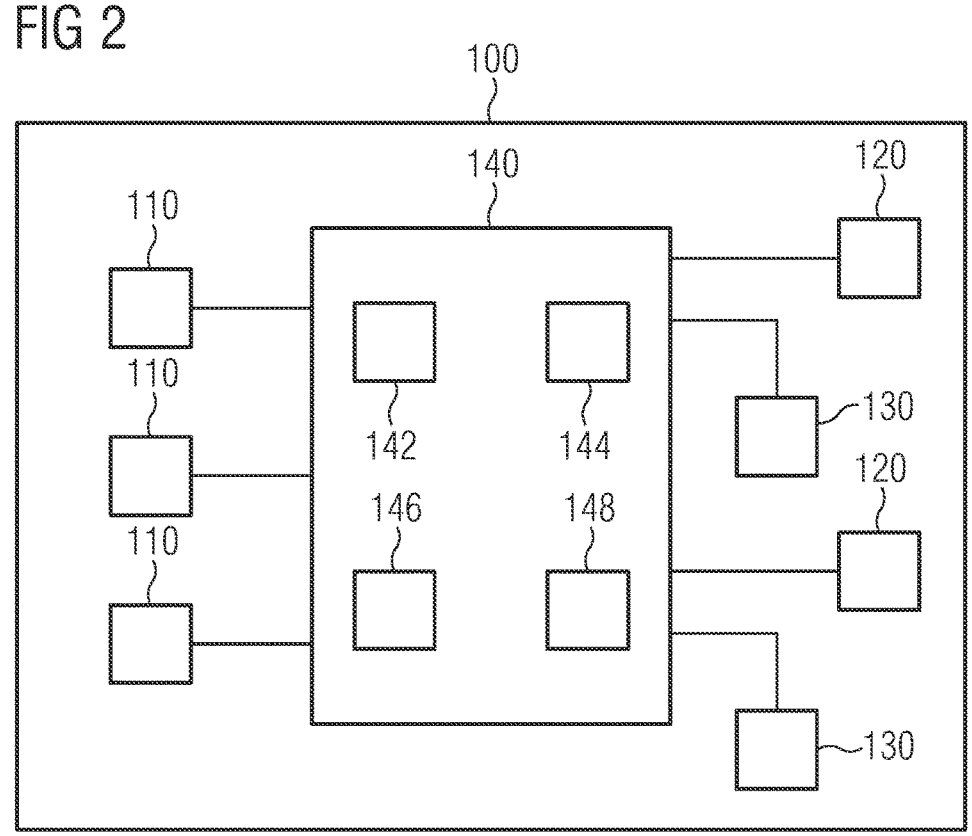
FIG. 2 is a schematic representation of a data network node.

The functions of the individual data network nodes 100 are described with reference to FIG. 2. A data network node 100 includes multiple input ports 110, a processing unit 140 (with a forwarding module 142, a delay and validity determination module 144, a scheduling module 146, and a queue managing module 148), a transmission buffer 130, and multiple output ports 120. Typically, at least one transmission buffer 130 is assigned to one output port 120.

Store-and-forward fashion means that the data network nodes 100 receive data packets from ingoing links via the input ports 110, store these packets locally, and transmit the data packets to outgoing links via the output ports 120 and towards the destination of the data packets. The data network nodes 100 may be part of a wireline network (e.g., implementing the Ethernet or optical links) or be part of a wireless network, or be part of a hybrid wired-wireless network. The data network node 100 may be implemented in a data network 10 of an airplane, a helicopter, a satellite, air taxi, or, in general, any aircraft or spacecraft.

In one embodiment, the data network nodes 100 process data packets from different logical connections called network flows. Such a flow contains a data stream, i.e., a sequence of packets, that is transported from a source to a destination through the data network 10. The data network nodes 10 have several input ports 110 and output port 120 to transmit and receive data and each output port 120 is associated with at least one transmission buffer 130 to store data that has not been transmitted over the output port 120 yet. When data of a specific flow is received at an input port 110, it is processed by the processing unit 140, a decision on the appropriate output port 120 is made, and the data packet is placed into the respective transmission buffer 130.

Generally, data management on output transmission buffers 130 is concerned with data packet flow scheduling and queue management. Typically, data packet flow scheduling and queue management include selecting a service scheduling strategy (like, for example, first-come-first-serve buffers, where the first packet to arrive is also transmitted first, last-come-first-serve, or random packet service order) and avoiding overflow of the transmission buffer 130 (which is typically done by congestion control and active queue management strategies, where packets are dropped if the queue grows too large).

Typical functions of schedulers aim to serve a set of queues in order to achieve a set of performance criteria, such as maximizing throughput, minimizing latency, or maximize fairness in terms of resource usage (e.g., equal CPU time for each queue, or access to bandwidth in a direct proportion of the size of the queue). There are currently several methods to perform scheduling, such as first-come-first-served, priority scheduling, round-robin, and credit based scheduling. However, none of them take into account the usefulness/ validity of the data packets. Due to that, existing schedulers may process data packets that are not needed any more or that cannot achieve their destination within a time limit to enable processing of the data packet by the destination.

The same occurs with queue management schemes. Existing schemes, such as Random Early Detection (RED), or Explicit Congestion Notification (ECN), aim at deciding about the set of data packets to get dropped when the queue in a transmission buffer gets full, or close to full, without having any consideration about the validity of the packets. This may result in keeping data packets in the queue that are not useful anymore to their destination, thereby wasting resources that could be assigned to more valuable data packets that still can be validly processed by their destination (data consumer end device or application).

As can be derived from this description, management of data packet buffers has a significant impact on the communication performance perceived by data flows, in terms of data rate and delay. For example, if more data is received by a data network node 100 than it can transmit on the outgoing link via its output port 120, the transmission buffer 130 will fill and each data packet must wait a significant time before being transmitted. This increases the delay perceived by the flow and degrades communication performance.

In avionic networks, sensing applications and control loops may create most of the traffic volume. A sensing application could be, e.g., the frequent status update of a passenger seat unit, smoke detection or usage monitoring of technical components. Control loops exist, e.g., for temperature and humidity control, light control, and up to aircraft control itself. At least some of existing flow scheduling and queue management techniques may not support these types of applications and consequently require a large data over-provisioning to achieve good performance. This leads to significant inefficiency in terms of network usage and supported applications.

The data network node 100 described herein aims to overcome these drawbacks.

The data network node 100 may implement functions of a router or a switch and is able to forward data packets belonging to different data traffic classes. For that, the data network node 100 has at least one transmission buffer 130 that is divided into multiple different queues, each one holding data of a certain traffic class. Traffic classes thereby contain data packets of a set of data flows and each queue corresponds to a data structure holding the packets belonging to the flows in the class. In one example, there can be one traffic class per flow, effectively leading to a single queue per flow, while in another example there can be one queue for all flows using the output port 120 assigned to a specific transmission buffer 130. The data network node 100 includes a scheduling module 146 to serve the different queues and a queue managing module 148 to organize the packets inside each queue.

The processing unit 140 may be a controller or a processor which is configured to store and/or execute commands that instruct the processor to perform certain functions. The processing unit 140 may be implemented on multiple processors or cores of a processor. The processing unit 140 includes at least the forwarding module 142, the delay and validity determination module 144, the scheduling module 146, and the queue managing module 148. These modules may be executed by the same processors or may be configured to be executed by different processors that are communicatively connected to one another in order to exchange data between the modules and allow the modules to interact with the input ports 110, the transmission buffers 130, and the output ports 120. The modules 142, 144, 146, 148 may be implemented as software modules and configured to execute the functions described herein.

The data network node 100 is configured to perform flow scheduling and queue management based on a validity value or validity of each data packet. The validity of data thereby captures how useful a piece of data currently is for the application generating and using the flow. For example, if the flow corresponds to an application that monitors a fast varying system (e.g., forces applied to and measured by a sensor), then its associated data loses validity when it becomes older, i.e., when the time since the data packet was sent exceeds a predetermined threshold value. In this case, data validity would be related to the time elapsed since the data has been injected into the network, which is referred to as data age. In another example, if a flow corresponds to an uncritical file transfer, its data will never lose validity, i.e., the data packet will not be dropped by the data network node due to validity considerations and these data packets will remain in the transmission buffer. It is one aspect of the data network node 100 to use the data validity value when making decisions in the data network node.

In particular, the data network node 100 is configured to dispatch data packets based on their validity. For that, the described dispatching method encompasses three basic functions as illustrated in FIG. 3: delay and validity estimation by the delay and validity determination module 144; queue management by the queue managing module 148; scheduling by the scheduling module 146.

Figure 3:
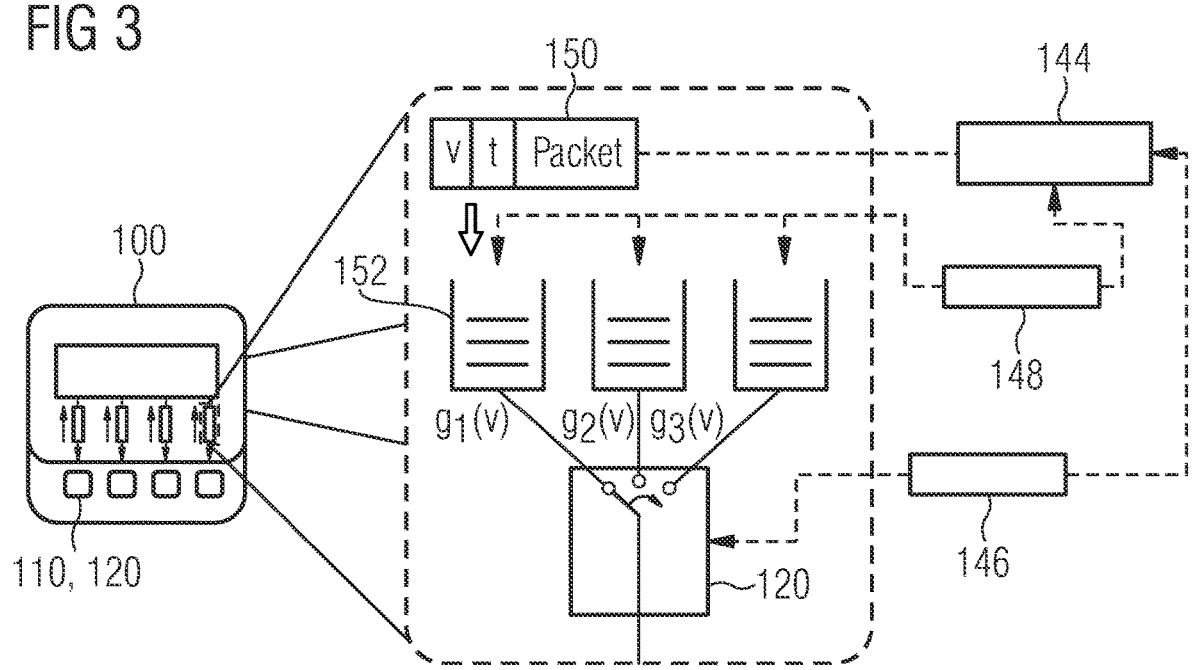
FIG. 3 is a schematic representation of a data network node.

FIG. 3 shows a data network node 100 with input ports 110 and output ports 120. A data packet 150 is provided with a time stamp (field t included in a header of the packet) and a validity value (field v included in a header of the packet, wherein the validity value may be used only internally in the current data network node 100 and another data network node may determine and assign another validity value when it receives a data packet based on the expected remaining data transmission time to the destination).

The delay and validity determination module 144 assigns to each data packet 150 a validity value v that reflects how useful the data packet is. This value later determines the treatment of the packet in the transmission queue and how urgent such packet should be transmitted. To determine the validity value, the delay and validity determination module 144 checks for each data packet 150 entering the transmission buffer 130 whether it has a time stamp. If not, it adds one to the data packet, which is later used to determine the elapsed time since the data packet 150 has entered the data network 10. The delay and validity determination module has information about the remaining delay or expected delay, i.e., the delay that the packet will experience in the remaining part of the network until it is delivered to its destination. This can be signaled to the delay and validity determination module 144 via a particular interface or provided by a configuration file that is stored in a memory of the data network node 100. Time stamp, current time value and remaining delay can be used to decide on the already passed delay, the packet urgency etc., based on which the delay and validity determination module 144 creates a validity value.

The exact validity function, i.e., the rule that determines the validity value, may be set on run-time or may be pre-configured. Furthermore, the data network node 100 has a computing unit that is capable of determining the validity of each data packet in a data traffic class whenever this is required.

It is noted that the validity or validity value may be an abstract term and that, depending on the exact function, either larger or lower validity values may be desirable. For example, when data age is used as validity function, the computing unit could use time stamps on the packets and a local clock to determine the age of each packet. In this case, a lower data age value would be preferable over a greater age value.

The delay and validity determination module 144 also derives a validity value associated with each traffic class by using information of the data packets 150 in the respective queue 152, which are denoted by $g_i(\square)$ with i=1, 2, 3 in FIG. 3. For example, the delay and validity determination module 144 may use the oldest packet in the queue to determine a maximum data traffic class age, or it may use the value of the first packet in the queue to determine the class age.

Different approaches to determine the validity value are described here. In these examples, t is the current time and t_s is the time stamp of the data packet. In a first example, the validity value is a weighted age of information and the function g_a (t, t_s)=b*(t–t_s) is the information age, i.e., the time elapsed since generation of the packet, weighted with a factor b. In a second example, the validity value is a weighted age threshold and the function g_t (t, t_s)=b*H(t–t_s–x), where x is a fixed threshold, H(.) is the Heaviside step function and b is a constant factor. That is, g_t(t, t_s) is b if the age of information (AoI) t–t_s>=x and zero otherwise. In a third example, the validity value reflects the expected estimation error of an internet of things (IoT) application that grows with AoI, e.g., g_e(t, t_s)=b*[1–exp (−(t–t_s))], or g_e(t, t_s)=b*log(t–t_s+x) where b and x are constants.

Figure 4:
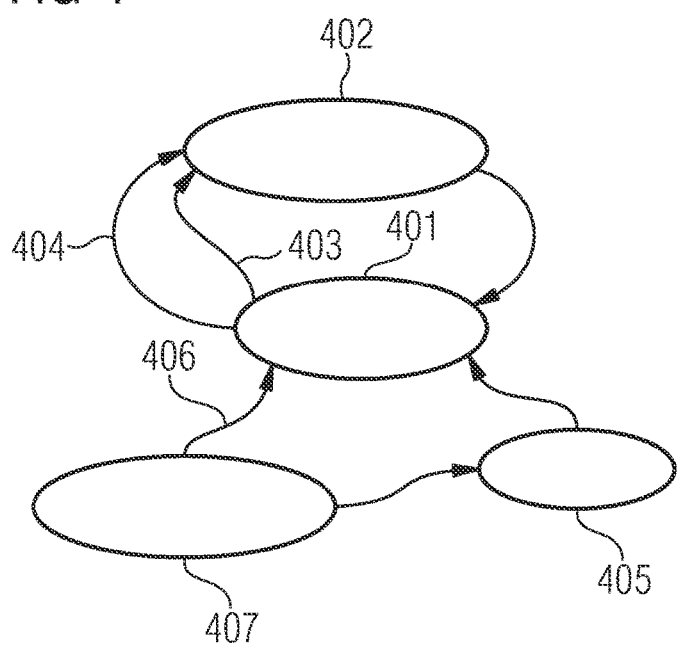
FIG. 4 is a schematic representation of states of a data network node.

With reference to FIG. 4, triggering of the delay and validity estimation function 402 implemented by the delay and validity determination module 144 is illustrated. Starting in an idle state 401, the delay and validity estimation function 402 can be triggered every time a new packet arrives, indicated by 403, in order to set the initial values of the timestamp and validity. Further, the delay and validity estimation function 402 can update the validity values of data packets as a result of a request from the scheduling module 146, as indicated by 404. Alternatively or additionally, the delay and validity estimation function 402 may update the validity values of data packets regularly based on a time set by a timer. A timer is set in 405. Starting in the idle state 401, in case of a time out indicated by 406, the delay and validity estimation function 407 is triggered.

Again with reference to FIG. 3, the queue managing module 148 is configured to implement queue management functions.

Within each queue 152, the queue managing module 148 has the capability to re-arrange the position of data packets, to replace and to discard data packets. The decisions about packet reordering and discarding packets are performed based on the validity value of a data packet and the time stamp, as recorded in the packet header. The time stamp of the packet together with the remaining (expected) delay are used to estimate the urgency in transmitting the packet, and so its position in the queue. For example, the experienced delay of a data packet can be observed by a data network node 100 by comparing the current time with the time stamp, while the remaining (expected) delay value can be used to determine the urgency of transmitting a data packet.

In one preferred example, the queue managing module 148 is configured to implement a first-come-first-serve mode or a discard and replace mode on the transmission buffer. In the first-come-first-serve mode, the data packet first inserted into the transmission buffer is served first. In the discard and replace mode, each new data packet replaces the data packet in the queue, i.e., each queue effectively holds only one data packet which is that one that was inserted latest into the queue.

Figure 5:
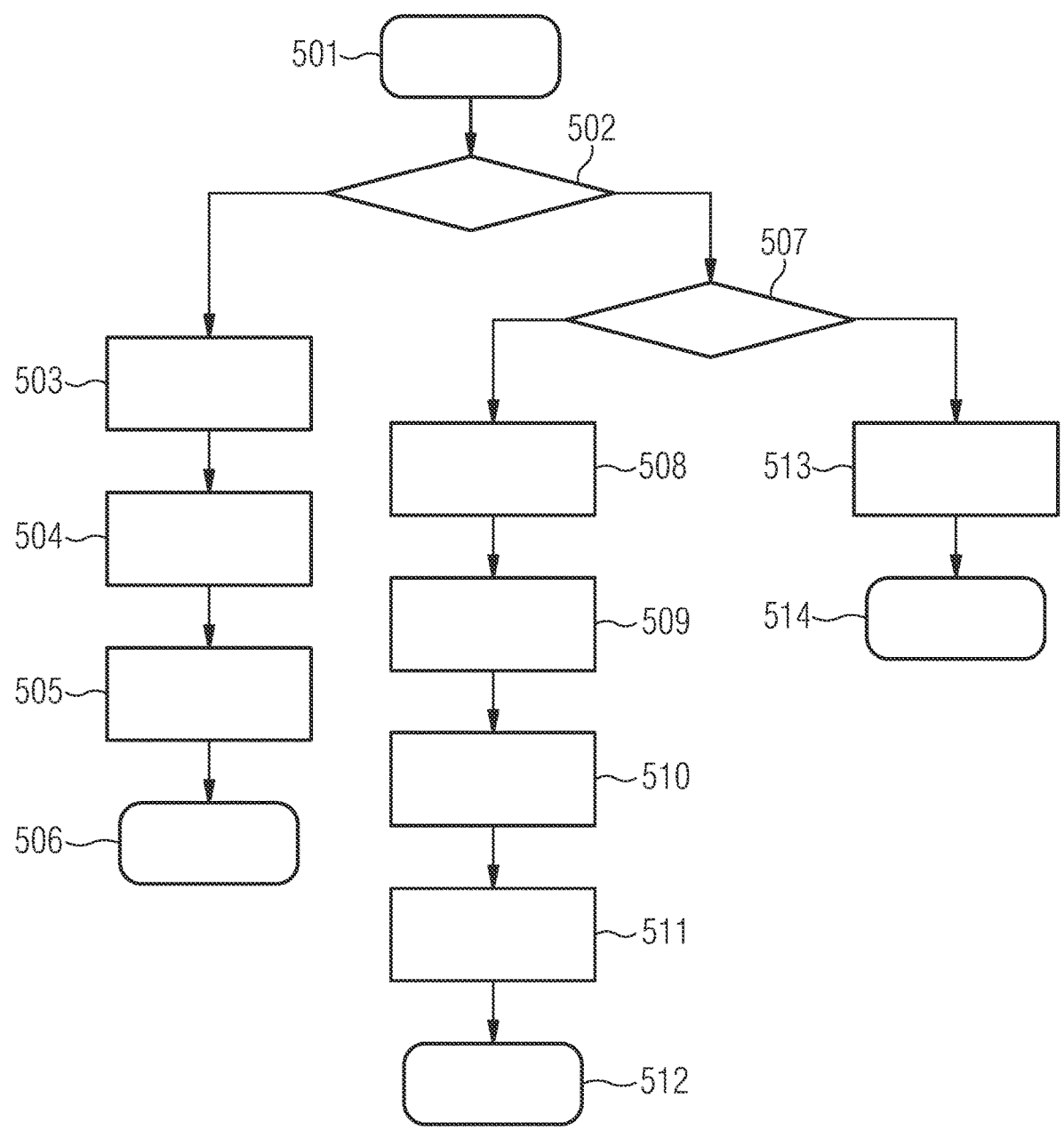
FIG. 5 is a flowchart indicating the process of data packet forwarding by a data network node in a data network.

FIG. 5 illustrates a possible implementation of a method based on which packets are handled in a queue based on their time stamps and validity.

At 501, a data packet incoming at an input port 110 of the data network node 100 is indicated. It is determined at 502 if the size of the queue for the incoming data packet is larger than a predetermined minimum queue size value. If the size of the queue is not larger than the minimum queue size value, the method proceeds to 503 and estimates the data packet delay, a data flow identification number is retrieved from the data packet header at 504, the data packet is inserted in a queue in increasing order of delay of the data flow identification number at 505, and the process ends at 506.

Alternatively, at 502, if the size of the queue is larger than the minimum queue size value, the method proceeds to 507 and determines if the size of the queue is larger than a predetermined maximum queue size value. If, at 507, it is determined that the size of the queue is not larger than the maximum queue size value, the method proceeds to 508 and estimates the data packet delay, a data flow identification number is retrieved from the data packet header at 509, an admission probability (p) is estimated based on the validity value of the data packet at 510, and at 511, inserting the packet with probability p in increasing order of delay of the data flow identification number is done, before the process ends at 512.

If, at 507, it is determined that the size of the queue is larger than the maximum queue size value, the method proceeds to 513. At 513, the packet is dropped and the process ends at 514.

Again with reference to FIG. 3, the data network node 100 implements a flow scheduling function in the scheduling module 146 for each output port 120, in which the next packet(s) to be transmitted is/are determined. The scheduling module 146 takes the validity values of each data traffic class as input and performs specific calculations that result in a decision on which packets of which data traffic class are served next. These packets are then taken out of their respective queue 152 and prepared for transmission by subsequent processes.

For example, the scheduling module 146 serves each queue 152 in order to share the link capability proportionally to the importance of the queue and the validity of the packets at the head of the queue. This means that, in one example, the scheduling module 146 dispatches from each queue a ratio of the total number of packets that can be forwarded, being that ratio computed based on the validity of the data queued.

Particularly, the scheduling module 146 may implement the following scheduling schemes when there are different queues with validity g_i (t, t_s). In a first example, index-based scheduling is implemented, and the scheduling module assigns the data packet with the largest g_i (t, t_s) value for transmission. In a second example, debt-based scheduling is implemented, and the scheduling module has two states for each queue i that evolve over time. A first state is a debt state Q_i(t) that evolves according to the formula Q_i(t+dt)=max{Q_i(t)+g_i(t+dt,t_s)−b_i,0}, where dt is a small time step, g_i(t,t_s) is the validity value at time t and b_i is a constant target value. A second state is a next-hop debt state S_i(t) that evolves according to the formula S_i(t+dt)=max{S_i(t)+g_i(t+dt,t_i)−c_i,0}, where t_i is the time stamp of the last packet that has been served from queue i and $c\_i$ is a constant target value that may differ from $b\_i$. It is assumed that $Q\_i(0)=S\_i(0)=0$ at initialization of the scheduler. Then, the scheduling module chooses the queue that maximizes the future debt reduction value $V\_i(t+dt)=[S\_i(t+dt)-Q\_i(t+dt)]$.

Figure 6:
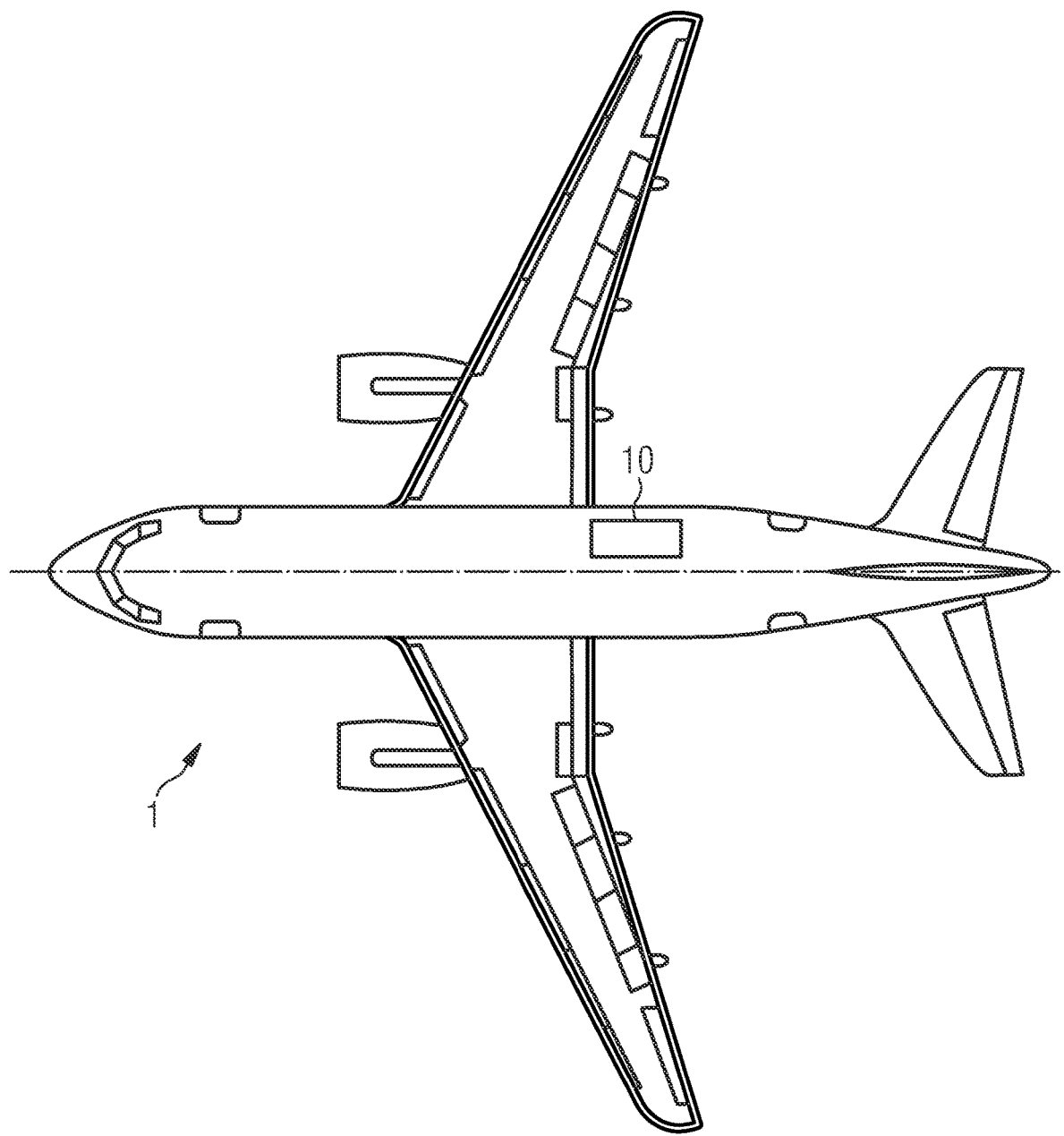
FIG. 6 is a schematic representation of an aircraft with a data network.

FIG. 6 shows an aircraft 1 with a data network 10 as described with reference to other examples, particularly that of FIG. 1, implementing data network nodes 100 shown in and described with reference to FIGS. 2 through 5.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
10 data network
11-15 end device
100 data network node
110 input port
120 output port
130 transmission buffer
140 processing unit
142 forwarding module
144 delay and validity determination module
146 scheduling module
148 queue managing module
150 data packet
152 queue

The invention claimed is:

1. A data network node for forwarding data packets in a data network, the data network node comprising:
an input port;
an output port;
a transmission buffer assigned to the output port, wherein the transmission buffer includes at least one data packet queue configured to hold data packets of at least one data traffic class; and
a processor connected to the input port and to the transmission buffer, the processor processing unit being configured to forward data packets received at the input port to the transmission buffer;
wherein the processor comprises:
a delay and validity determination module configured to determine and assign a validity value to each data packet incoming via the input port based on a time stamp of the data packet, a current time value, an expected delay on a route of the data packet to a destination of the data packet, and a packet urgency value;
a scheduling module configured to execute a first function of serving the at least one data packet queue in the transmission buffer to achieve a set of performance criteria; and
a queue managing module configured to execute a second function of avoiding an overflow of the transmission buffer by applying a queue management strategy to the at least one data packet queue;
wherein the scheduling module and the queue managing module are configured to execute the first function and the second function, respectively, based on the validity value assigned to one of the data packets in the transmission buffer; and
wherein the delay and validation determination module is configured to:
check whether an incoming data packet has a time stamp; and
when the incoming data packet has no time stamp, add the current time value as the time stamp to a header of the incoming data packet.

2. The data network node of claim 1, wherein the data network node is configured to receive the expected delay of a data packet on the route to its destination via a control interface or to read the expected delay of a data packet on the route to its destination from a configuration file.

3. The data network node of claim 1, wherein:
the at least one data packet queue is configured to hold data packets of multiple data traffic classes; and
the delay and validity determination module is configured to determine a data traffic class validity value associated with each one of the multiple data traffic classes.

4. The data network node of claim 1, wherein the delay and validity determination module is configured to determine and update the validity value of one or more of the data packets in the transmission buffer upon a request and/or when a predetermined period of time has expired.

5. The data network node of claim 1, wherein the data network node is configured to drop a data packet when its validity value exceeds or falls below a predetermined threshold value.

6. The data network node of claim 1, wherein the data network node is configured to trigger the delay and validity determination module every time a data packet arrives at the input port.

7. The data network node of claim 1, wherein the queue managing module is configured to re-arrange a position of data packets in the transmission buffer based on the validity value of the data packets.

8. The data network node of claim 1, wherein the queue managing module is configured to replace and/or discard data packets in the transmission buffer based on the validity value of the data packets.

9. The data network node of claim 1, wherein:
the queue managing module is configured to determine the urgency value of a data packet in the transmission buffer based on the current time value and the expected delay on the route of the data packet to its destination; and
the queue managing module is configured to determine a position of the data packet in the at least one data packet queue based on the urgency value.

10. The data network node of claim 1, wherein the scheduling module is configured to determine, based on the validity values of the data packets in the transmission buffer, which data packet of which one of the at least one data traffic class to process next.

11. A method for forwarding data packets in a data network, the method comprising:
providing at least one data network node comprising:
an input port;
an output port;
a transmission buffer assigned to the output port, wherein the transmission buffer includes at least one data packet queue that holds data packets of at least on data traffic class; and
a processor connected to the input port and to the transmission buffer;
receiving data packets at the input port;
forwarding, using the processor, the data packets received at the input port to the transmission buffer;
determining and assigning, by a delay and validity determination module of the processor, a validity value to each data packet incoming via the input port based on a time stamp of the data packet, a current time value, an expected delay on a route of the data packet to its destination, and a packet urgency value;
executing, by a scheduling module of the processor, a first function of serving the at least one data packet queue in a transmission buffer to achieve a set of performance criteria;
executing, by a queue managing module of the processor, a second function of avoiding an overflow of the transmission buffer by applying a queue management strategy to the at least one data packet queue; and
using the delay and validation determination module for checking whether an incoming data packet has a time stamp and, when the incoming data packet has no time stamp, adding the current time value as the time stamp to a header of the incoming data packet;
wherein the first function and the second function are executed, respectively, based on the validity value determined and assigned to one of the the data packets in the transmission buffer.

12. A data network, comprising:
a plurality of end devices; and
a plurality of data network nodes, at least one of which is the data network node of claim 1;
wherein the plurality of data network nodes are communicatively interconnected with one another to transmit data packets from a first end device to a second end device.

13. An aircraft comprising the data network of claim 12.

14. An aircraft comprising:
a data network comprising:
a plurality of end devices comprising at least a first end device and a second end device; and
a plurality of data network nodes that are communicatively interconnected with one another to transmit data packets from the first end device to the second end device, one or more data network nodes of the plurality of data network nodes comprising:
an input port;
an output port;
a transmission buffer assigned to the output port, wherein the transmission buffer includes at least one data packet queue configured to hold data packets of at least one data traffic class; and
a processor connected to the input port and to the transmission buffer, the processor being configured to forward data packets received at the input port to the transmission buffer;
wherein the processor comprises:
a delay and validity determination module configured to determine and assign a validity value to each data packet incoming via the input port based on a time stamp of the data packet, a current time value, an expected delay on a route of the data packet to a destination of the data packet, and a packet urgency value;
a scheduling module configured to execute a first function comprising serving the at least one data packet queue in the transmission buffer to achieve a set of performance criteria; and
a queue managing module configured to execute a second function comprising avoiding an overflow of the transmission buffer by applying a queue management strategy to the at least one data packet queue;
wherein the scheduling module and the queue managing module are configured to execute the first function and the second function, respectively, based on the validity value assigned to one of the data packets in the transmission buffer;
wherein the first end device is a sensor located in the aircraft and arranged to sense a physical parameter of a component of the aircraft; and
wherein the second end device is an actuator located in the aircraft and arranged to initiate a function of a component of the aircraft.

15. The aircraft of claim 14, wherein:
the one or more data network nodes is configured to receive the expected delay of a data packet on the route to its destination via a control interface or to read the expected delay of a data packet on the route to its destination from a configuration file;
the delay and validity determination module of the one or more data network nodes is configured to determine and update a validity value of one or more of the data packets in the transmission buffer upon a request and/or when a predetermined period of time has expired;
the one or more data network nodes is configured to drop a data packet when its validity value exceeds or falls below a predetermined threshold value;
the one or more data network nodes is configured to trigger the delay and validity determination module every time a data packet arrives at the input port;
the queue managing module of the one or more data network nodes is configured to re-arrange a position of data packets in the transmission buffer based on the validity value of the data packets;

the queue managing module of the one or more data network nodes is configured to replace and/or discard data packets in the transmission buffer based on the validity value of the data packets; and/or the scheduling module of the one or more data network nodes is configured to determine, based on the validity values of the data packets in the transmission buffer, which data packet of which one of the at least one data traffic class to process next.

16. The aircraft of claim 14, wherein:

the at least one data packet queue is configured to hold data packets of multiple data traffic classes; and the delay and validity determination module is configured to determine a data traffic class validity value associated with each one of the multiple data traffic classes.

17. The aircraft of claim 14, wherein:

the queue managing module is configured to determine the urgency value of a data packet in the transmission buffer based on the current time value and the expected delay on the route of the data packet to its destination; and the queue managing module is configured to determine a position of the data packet in the at least one data packet queue based on the urgency value.

18. The method of claim 11, wherein:

the one or more data network nodes receives the expected delay of a data packet on the route to its destination via a control interface or reads the expected delay of a data packet on the route to its destination from a configuration file;

the delay and validity determination module of the one or more data network nodes determines and updates a validity value of one or more of the data packets in the transmission buffer upon a request and/or when a predetermined period of time has expired;

the one or more data network nodes drops a data packet when its validity value exceeds or falls below a predetermined threshold value;

the one or more data network nodes triggers the delay and validity determination module every time a data packet arrives at the input port;

the queue managing module of the one or more data network nodes re-arranges a position of data packets in the transmission buffer based on the validity value of the data packets;

the queue managing module of the one or more data network nodes replaces and/or discards data packets in the transmission buffer based on the validity value of the data packets; and/or the scheduling module of the one or more data network nodes determines, based on the validity values of the data packets in the transmission buffer, which data packet of which one of the at least one data traffic class to process next.

19. The method of claim 11, wherein:

the at least one data packet queue is used to hold data packets of multiple data traffic classes; and the delay and validity determination module is used to determines a data traffic class validity value associated with each one of the multiple data traffic classes.

20. The method of claim 11, wherein:

the queue managing module determines the urgency value of a data packet in the transmission buffer based on the current time value and the expected delay on the route of the data packet to its destination; and the queue managing module determines a position of the data packet in the at least one data packet queue based on the urgency value.

* * * * *